US011314287B2

(12) United States Patent
Holung et al.

(10) Patent No.: US 11,314,287 B2
(45) Date of Patent: Apr. 26, 2022

(54) DISPLAY STABILIZATION IN FOLDABLE DEVICE

(71) Applicant: Lenovo (Singapore) Pte. Ltd., Singapore (SG)

(72) Inventors: Joseph Anthony Holung, Wake Forest, NC (US); Joseph David Plunkett, Raleigh, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 26 days.

(21) Appl. No.: 16/932,175

(22) Filed: Jul. 17, 2020

(65) Prior Publication Data

US 2022/0019267 A1 Jan. 20, 2022

(51) Int. Cl.
*G09G 5/00* (2006.01)
*G06F 1/16* (2006.01)
*H04B 5/00* (2006.01)
*G09F 9/30* (2006.01)

(52) U.S. Cl.
CPC .......... *G06F 1/1677* (2013.01); *G06F 1/1626* (2013.01); *G06F 1/1652* (2013.01); *G09F 9/301* (2013.01); *H04B 5/0031* (2013.01)

(58) Field of Classification Search
USPC .............. 345/156, 1.3, 173, 174; 361/679.56
See application file for complete search history.

(56) References Cited

U.S. PATENT DOCUMENTS

| | | | |
|---|---|---|---|
| 9,946,312 B2* | 4/2018 | McCracken | H05K 5/0086 |
| 2013/0076597 A1* | 3/2013 | Becze | G02B 6/0001 |
| | | | 345/1.3 |
| 2013/0077236 A1* | 3/2013 | Becze | G06F 3/044 |
| | | | 361/679.56 |
| 2018/0181361 A1* | 6/2018 | Becze | G06F 1/1692 |
| 2018/0210514 A1* | 7/2018 | Wang | G06F 1/1681 |
| 2019/0247050 A1* | 8/2019 | Goldsmith | A61F 2/82 |
| 2020/0210132 A1* | 7/2020 | Becze | G06F 3/04897 |
| 2020/0233537 A1* | 7/2020 | Hong | G06F 3/04886 |
| 2021/0096605 A1* | 4/2021 | Bailey | G06F 3/0202 |

* cited by examiner

*Primary Examiner* — Thuy N Pardo
(74) *Attorney, Agent, or Firm* — Ference & Associates LLC

(57) ABSTRACT

One embodiment provides a method, including: receiving, from at least one sensor associated with an information handling device, an indication to transmit an electrical pulse to a magnetic coupling integrated into the information handling device; transmitting, responsive to the receiving and using a pulse transmitter, the electrical pulse to the magnetic coupling; and affecting a function of the magnetic coupling based on the transmitted electrical pulse. Other aspects are described and claimed.

20 Claims, 3 Drawing Sheets

DISPLAY STABILIZATION IN FOLDABLE DEVICE

BACKGROUND

Foldable, or "clamshell", information handling devices ("devices"), for example laptop computers, handheld gaming consoles, tablets, certain hybrid devices, and the like, are generally composed of two or more sections that fold via a hinge. Generally, the interface components in these devices, such as the keys and the display screen, are kept inside the closed clamshell, thereby protecting them from damage and unintentional use. To access the interface components, users must physically separate the sections from one another (e.g., by holding a base section of the device down while lifting up on the display section, etc.).

BRIEF SUMMARY

In summary, one aspect provides a method, comprising: receiving, from at least one sensor associated with an information handling device, an indication to transmit an electrical pulse to a magnetic coupling integrated into the information handling device; transmitting, responsive to the receiving and using a pulse transmitter, the electrical pulse to the magnetic coupling; and affecting a function of the magnetic coupling based on the transmitted electrical pulse.

Another aspect provides an information handling device, comprising: at least one sensor; a processor; a memory device that stores instructions executable by the processor to: receive an indication to transmit an electrical pulse to a magnetic coupling integrated into the information handling device; transmit, responsive to the receiving, the electrical pulse to the magnetic coupling; and affect a function of the magnetic coupling based on the transmitted electrical pulse.

A further aspect provides a product, comprising: a storage device that stores code, the code being executable by a processor and comprising: code that receives an indication to transmit an electrical pulse to a magnetic coupling; code that transmits, responsive to the code that receives, the electrical pulse to the magnetic coupling; and code that affects a function of the magnetic coupling based on the transmitted electrical pulse.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
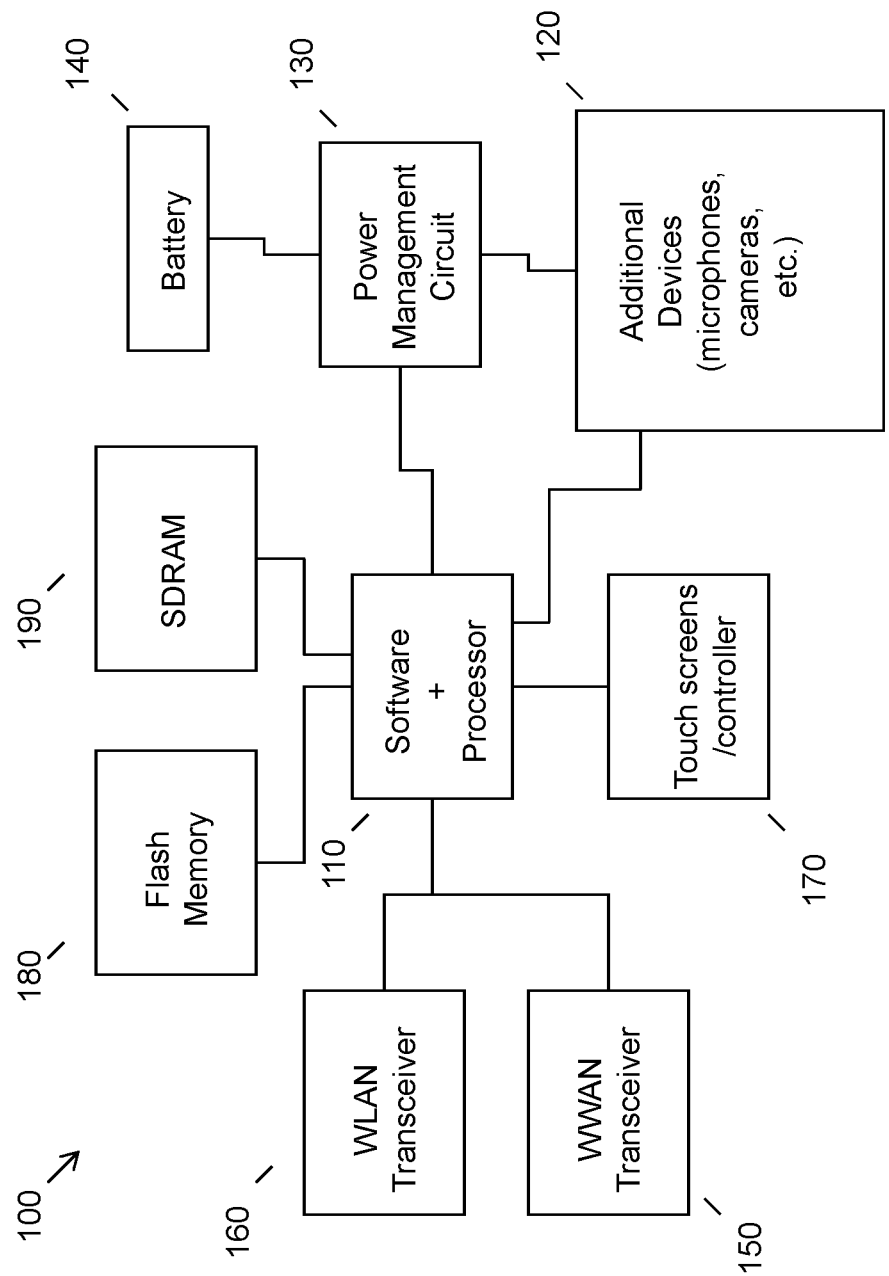
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional clamshell devices contain at least one mechanical friction hinge that is positioned in-between the device sections. The presence of this hinge may allow users to open and close the device and to manipulate the sections with respect to one another. In an ideal situation, a user could open the device using minimal effort and also effectively secure the display section of the device at the user's desired viewing position. Current devices, however, are unable to successfully accomplish both of these operational goals. In fact, efforts to achieve one goal will reduce the likelihood that the other will also be achieved. More particularly, conventional devices that are easy to open (i.e., because there is less friction in the mechanical hinge) are more susceptible to external forces affecting the stability of the display section and may cause it to more easily move out of a desired viewing position. Conversely, devices that have a high frictional component to their hinges are well secured but require more effort to open, close, or manipulate, e.g., a user may need to use two hands instead of one (i.e., one hand to hold the base section and the other to manipulate the display section).

One potential solution to the foregoing issue is to introduce mechanical detents to the hinge. These detents provide for a plurality of stopping points that may secure a section of the device in place until an additional amount of force is provided to the section/device in order to move it out of its secured position. However, utilization of mechanical detents in many conventional devices is not practical. More particularly, the small geometry of many devices does not allow for mechanisms of the size of mechanical detents to be practically incorporated into the device housing. Furthermore, a device which has its detent positions determined by mechanical action has a relatively short life due to the frequent frictional engagement of parts.

Accordingly, an embodiment provides a device with magnetic components that both enable a user to open the device with minimal effort and also effectively secure the device at various viewing positions. In an embodiment, a magnetic coupling may replace the conventional friction hinge to enable users to effortlessly open and close the device and manipulate sections back and forth with respect to one another. Concepts associated with this coupling are more fully covered in commonly owned U.S. patent application Ser. No. 16/915,043, filed Jun. 29, 2020, the contents of which are incorporated by reference herein. In conjunction with the aforementioned magnetic coupling, an embodiment also provides for the presence of another magnetic coupling that has inherently stable equilibrium positions (i.e., dictated by North-South pole pairs present around the coupling) that may mimic the detent positions of a conventional rotary friction hinge. These magnetic detents, which add resistance at certain angular positions, may be dynamically switched on or off in certain contextual situations to facilitate smooth manipulation of the device sections.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
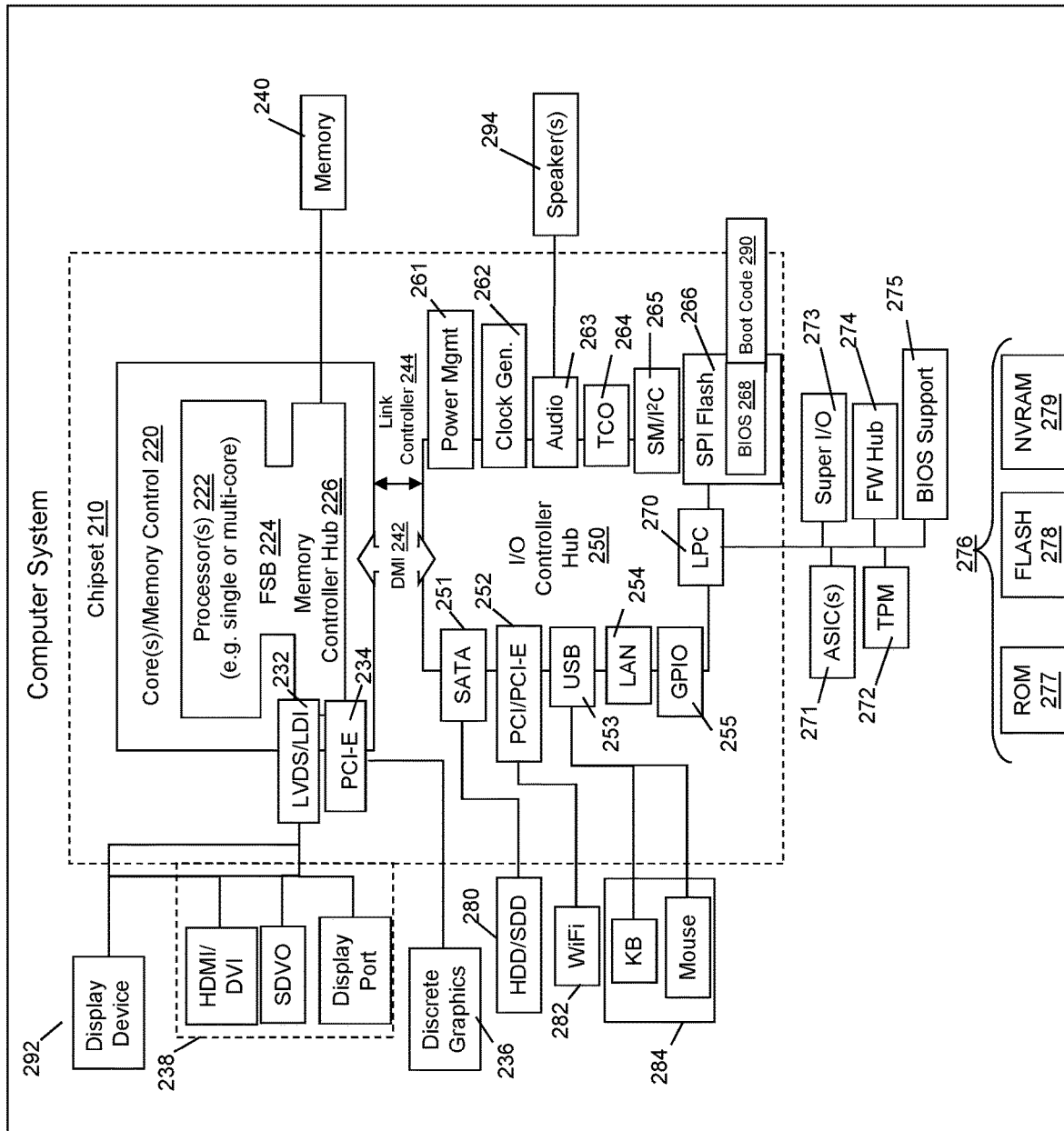
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices having at least one magnetic hinge. For example, the circuitry outlined in FIG. 1 may be implemented in a mobile handheld device, whereas the circuitry outlined in FIG. 2 may be implemented in a laptop computer.

Figure 3:
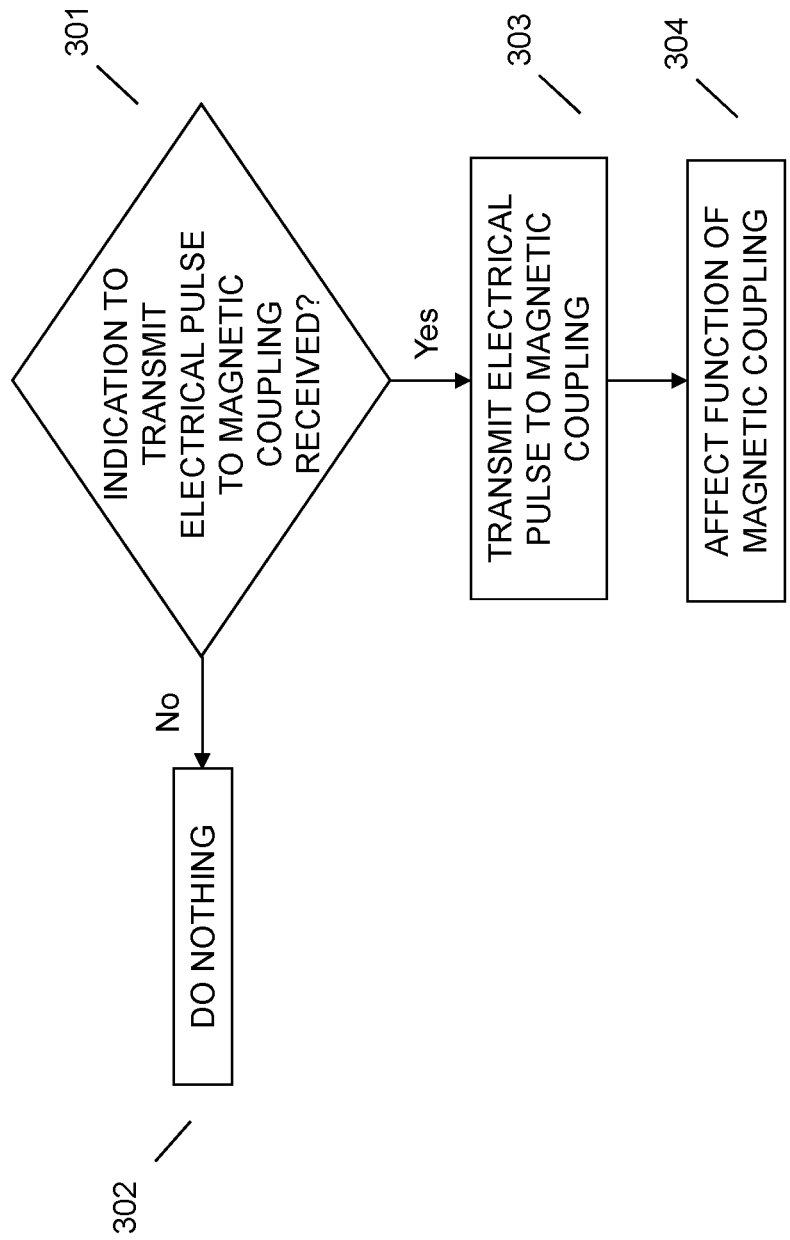
FIG. 3 illustrates an example method of activating and/or deactivating magnetic detents of a magnetic coupling integrated into a device.

Referring now to FIG. 3, an embodiment provides a device having a magnetic coupling hinge containing a plurality of stable equilibrium positions, i.e., magnetic detents. At 301, an embodiment may receive an indication to transmit an electrical pulse to a magnetic coupling integrated into the device. The magnetic coupling as described herein may be positioned in place of a conventional friction hinge and may be used in conjunction with another magnetic coupling to accomplish the previously described operational goals (i.e., easy manipulation of device sections while maintaining section stability).

In an embodiment, the magnetic coupling may have a plurality of inherently stable equilibrium positions, i.e., magnetic detents. These magnetic detents provide the same function as conventional mechanical detents in the sense that they may secure the display of the device at certain rotary angles. In an embodiment, the magnetic detent positions may be governed by the design of the magnetic coupling. More particularly, the number and/or the position of the magnetic detents correspond to the number and position of North-South pole pairs around the magnetic coupling. When the magnetic detents are active, a display screen may be stabilized at a particular position as a result of the attraction between the North-South pole pair corresponding to that position.

An embodiment may transmit the electrical pulse to the magnetic coupling responsive to receiving a trigger indication. In an embodiment, the magnetic detents may be activated and/or deactivated responsive to receiving the electrical pulse. More particularly, the magnetic coupling may comprise an electropermanent magnet that has a coil wired around it. When an electrical pulse is transmitted to the electropermanent magnet (e.g., via a pulse transmitter integrated into the device housing, etc.), the magnetic polarity of the coupling may be switched from on to off, or vice versa, and stays that way until another pulse is received.

By dynamically identifying the situations in which a pulse should be sent to the coupling, an embodiment may be able to ensure smooth user manipulation of the display section. Accordingly, in an embodiment, the pulse may be transmitted to the electropermanent magnet in response to the detection of one or more different contextual triggers. The triggers may be detected, for example, by one or more sensors integrated into the device (e.g., camera sensors, audio sensors, accelerometers, gyroscopes, Global Positioning System (GPS) sensors, etc.).

Following are provided a plurality of non-limiting examples of triggers that may influence a pulse to be transmitted to the electropermanent magnet. It is important to note that these examples are not exhaustive and other triggers, not explicitly described here, may also be detected and utilized. Additionally, the subsequent examples may be used alone or in combination with each other to influence activation and deactivation of the magnetic detents.

In an embodiment, accelerometer data associated with the display section may be utilized to dynamically predict when mechanical detents should be activated. More particularly, responsive to identifying (i.e., from the accelerometer data) that a display section of a device is no longer being moved or adjusted, an embodiment may conclude that a user has positioned the display section at a desired viewing angle. Thereafter, an embodiment may transmit a pulse to the electropermanent magnet to activate the magnetic detents to secure the display section at the magnetic detent position closest to the angular position that the user adjusted their display to. Similarly, responsive to detecting that a predetermined amount of force is being applied to the display section in a secured position, an embodiment may conclude that a user desires to adjust a position of the display and may thereafter transmit a pulse to the electropermanent magnet to deactivate the magnetic detents.

As another example, an embodiment may contain a front-facing camera (e.g., an always-on static or dynamic camera positioned in the bezel or notch of the display section, etc.) that may be able to continuously capture images and/or video of the user. An embodiment may compare these media captures to predetermined user movements (e.g., a user's hand reaching to grab a bezel portion of the display section, etc.) stored in an accessible database. The predetermined user movements may be programmed by a manufacturer and/or adjusted by a user and may correlate with a user's intention to adjust a position of the display section. Responsive to detecting that a match exists between the captured media and the predetermined user movements, an embodiment may transmit a pulse to the electropermanent magnet to activate or disable the magnetic device.

In yet another example, transmission of the pulse may be influenced by detection that a user has accessed a particular application. More particularly, users may prefer to interact with applications at particular viewing angles. For example, a user may prefer to interact with a word processing application with the display section positioned substantially 95-100 degrees with respect to the keyboard section. The same user may also prefer to have their laptop display section positioned 120 degrees with respect to the keyboard section when interacting with a media streaming application. Accordingly, an embodiment may receive an indication of an active application that a user intends to interact with. An embodiment may then access an accessible database that comprises a listing of preferred viewing angles for various application and/or application types. Responsive to identifying that a current viewing angle does not correspond to a preferred viewing angle for the active application, an embodiment may dynamically transmit a pulse to the electropermanent to disable the magnetic detents in anticipation of a user manipulating the display screen to their desired viewing angle. Responsive to identifying that the viewing angle of the device substantially corresponds to a preferred viewing angle for the active application, an embodiment may transmit another pulse to activate the detent positions, thereby securing the display screen in place.

In yet another example, transmission of the pulse may be influenced by detection that a user is present in a particular geographic location. More particularly, users may prefer to interact with their device at different viewing angles depending on the location that the interaction occurs. For example, a user in their office may prefer to have their laptop display section positioned substantially 100 degrees with respect to the keyboard section. The same user may also prefer to have their laptop display section positioned 120 degrees with respect to the keyboard section when interacting with the device at home (e.g., while the laptop is positioned on the user's lap, etc.). In an embodiment, geographic position data may be used to identify the user's position and thereafter compare the identified position to an accessible database comprising a listing of preferred viewing angles at different geographic positions. An embodiment may then transmit a pulse to the electropermanent magnet to activate or deactivate the magnetic detents based upon a result of the foregoing comparison.

Responsive to not receiving an indication and/or detecting a trigger, at 301, an embodiment may, at 302, take no additional action. Conversely, responsive to receiving an indication and/or detecting a trigger, at 301, an embodiment may transmit, at 303, an electrical pulse to the magnetic coupling. Receipt of the pulse at the magnetic coupling may correspondingly affect/control, at 304, a function performed by the magnetic coupling. More particularly, receipt of the pulse at the magnetic coupling may adjust the polarity of the electropermanent magnet, which may correspondingly activate or deactivate the magnetic detents. For instance, if the magnetic detents were originally in an active state, receipt of a new pulse would subsequently deactivate the magnetic detents by reversing the attraction of the pole pairs. Conversely, if the magnetic detents were originally inactive, receipt of a new pulse would subsequently activate the magnetic detents by adjusting the polarity of the electropermanent magnet to create attraction between the pole pairs.

The various embodiments described herein thus represent a technical improvement to conventional methods and devices for maneuvering and securing a display section of a device. Using the techniques described herein, an embodiment may receive an indication to transmit an electrical pulse to a magnetic coupling. The indication may be derived from detection of one or more contextual triggers. Responsive to receiving the indication, an embodiment may transmit the electrical pulse to the magnetic coupling, which may thereby affect a function of the magnetic coupling. For example, the electrical pulse may cause the magnetic coupling to activate or deactivate certain magnetic detent positions of the coupling. Such an embodiment may optimize user interaction with their device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, from at least one sensor associated with an information handling device, an indication to transmit an electrical pulse to a magnetic coupling, wherein the magnetic coupling comprises a hinge integrated into the information handling device;
    transmitting, responsive to the receiving and using a pulse transmitter, the electrical pulse to the magnetic coupling; and
    affecting a function of the magnetic coupling based on the transmitted electrical pulse, wherein the affecting the function comprises adjusting a polarity of the magnetic coupling.

2. The method of claim 1, wherein the receiving the indication comprises receiving accelerometer data associated with a display section of the information handling device.

3. The method of claim 1, wherein the receiving the indication comprises identifying activation of a predetermined application.

4. The method of claim 1, wherein the receiving the indication comprises identifying that a captured image of a user movement corresponds to a predetermined user movement.

5. The method of claim 1, wherein the receiving the indication comprises identifying a geographic location associated with a user.

6. The method of claim 1, wherein the transmitting comprises transmitting the electrical pulse to an electropermanent magnet of the magnetic coupling.

7. The method of claim 1, wherein the magnetic coupling comprises a predetermined number of magnetic detent positions.

8. The method of claim 7, wherein each of the predetermined number of magnet detent positions is dictated by a particular North-South pair positioned around the magnetic coupling.

9. The method of claim 1, wherein the affecting the function comprises activating at least one magnetic detent of the magnetic coupling.

10. The method of claim 1, wherein the affecting the function comprises deactivating at least one magnetic detent of the magnetic coupling.

11. An information handling device, comprising:
   at least one sensor;
   a processor;
   a memory device that stores instructions executable by the processor to:
   receive an indication to transmit an electrical pulse to a magnetic coupling, wherein the magnetic coupling comprises a hinge integrated into the information handling device;
   transmit, responsive to the receiving, the electrical pulse to the magnetic coupling; and
   affect a function of the magnetic coupling based on the transmitted electrical pulse, wherein to affect the function comprises adjusting a polarity of the magnetic coupling.

12. The information handling device of claim 11, wherein the instructions executable by the processor to receive the indication comprise instructions executable by the processor to receive accelerometer data associated with a display section of the information handling device.

13. The information handling device of claim 11, wherein the instructions executable by the processor to receive the indication comprise instructions executable by the processor to identify activation of a predetermined application.

14. The information handling device of claim 11, wherein the instructions executable by the processor to receive the indication comprise instructions executable by the processor to identify that a captured image of a user movement corresponds to a predetermined user movement.

15. The information handling device of claim 11, wherein the instructions executable by the processor to transmit comprise instructions executable by the processor to transmit the electrical pulse to an electropermanent magnet of the magnetic coupling.

16. The information handling device of claim 11, wherein the magnetic coupling comprises a predetermined number of magnetic detent positions.

17. The information handling device of claim 11, wherein each of the predetermined number of magnet detent positions is dictated by a particular North-South pair positioned around the magnetic coupling.

18. The information handling device of claim 11, wherein the instructions executable by the processor to affect the function comprise instructions executable by the processor to activate at least one magnetic detent of the magnetic coupling.

19. The information handling device of claim 11, wherein the instructions executable by the processor to affect the function comprise instructions executable by the processor to deactivate at least one magnetic detent of the magnetic coupling.

20. A product, comprising:
   a storage device that stores code, the code being executable by a processor and comprising:
   code that receives an indication to transmit an electrical pulse to a magnetic coupling, wherein the magnetic coupling comprises a hinge integrated into an information handling device;
   code that transmits, responsive to the code that receives, the electrical pulse to the magnetic coupling; and
   code that affects a function of the magnetic coupling based on the transmitted electrical pulse, wherein the code that affects the function comprises adjusting a polarity of the magnetic coupling.

* * * * *